(12) United States Patent
Nakano et al.

(10) Patent No.: US 11,455,372 B2
(45) Date of Patent: Sep. 27, 2022

(54) PARAMETER ESTIMATION APPARATUS, PARAMETER ESTIMATION METHOD, AND COMPUTER-READABLE RECORDING MEDIUM

(71) Applicant: NEC Corporation, Tokyo (JP)

(72) Inventors: Gaku Nakano, Tokyo (JP); Takashi Shibata, Tokyo (JP)

(73) Assignee: NEC CORPORATION, Tokyo (JP)

(*) Notice: Subject to any disclaimer, the term of this patent is extended or adjusted under 35 U.S.C. 154(b) by 420 days.

(21) Appl. No.: 16/607,916

(22) PCT Filed: Apr. 27, 2017

(86) PCT No.: PCT/JP2017/016869
§ 371 (c)(1),
(2) Date: Oct. 24, 2019

(87) PCT Pub. No.: WO2018/198298
PCT Pub. Date: Nov. 1, 2018

(65) Prior Publication Data
US 2020/0097522 A1 Mar. 26, 2020

(51) Int. Cl.
*G06F 17/18* (2006.01)
*G06F 7/60* (2006.01)
*G06F 7/76* (2006.01)

(52) U.S. Cl.
CPC .............. *G06F 17/18* (2013.01); *G06F 7/60* (2013.01); *G06F 7/76* (2013.01)

(58) Field of Classification Search
CPC ... G06F 7/60; G06F 7/76; G06F 17/17; G06F 17/18

(Continued)

(56) References Cited

U.S. PATENT DOCUMENTS 7,188,054 B2  3/2007  Kadowaki et al.
9,719,119 B2  8/2017  Beauprez et al.
(Continued)

FOREIGN PATENT DOCUMENTS

JP   2005-201869 A   7/2005
JP   2015-504654 A   2/2015

OTHER PUBLICATIONS

Written Opinion in International Application No. PCT/JP2017/016869, dated Jul. 11, 2017.

(Continued)

*Primary Examiner* — John H Le
(74) *Attorney, Agent, or Firm* — Sughrue Mion, PLLC

(57) ABSTRACT

A parameter estimation apparatus 10 is an apparatus for calculating a threshold for separating a plurality of data points into outliers and inliers and estimating a parameter fitting the inliers. The parameter estimation apparatus 10 includes: a parameter estimation unit 13 configured to estimate the parameter by using the plurality of data points as input; a threshold setting unit 14 configured to calculate the threshold based on statistical information of residuals of the data points; and a convergence determination unit 15 configured to determine whether or not convergence of the estimation of the parameter is reached based on the estimated parameter and the calculated threshold, and to cause the parameter estimation unit 13 and the threshold setting unit 14 to each execute processing again if the convergence determination unit 15 determines that convergence is not reached.

12 Claims, 5 Drawing Sheets

(58) Field of Classification Search
USPC .......................................................... 702/179
See application file for complete search history.

(56) References Cited

U.S. PATENT DOCUMENTS

| | | | |
|---|---|---|---|
| 9,951,362 B2 | 4/2018 | Beauprez et al. | |
| 2007/0255512 A1* | 11/2007 | Delenstarr | ............. G16B 50/00 |
| | | | 702/179 |
| 2013/0132407 A1* | 5/2013 | Krishnmurthy | ....... G06F 17/175 |
| | | | 707/E17.084 |

OTHER PUBLICATIONS

International Search Report in International Application No. PCT/JP2017/016869, dated Jul. 11, 2017.
Yoshio Oyanagi, "Robust Suiteiho to Data Kaiseki eno Oyo", Operations Research as a Management Science Research, May 1978, vol. 23, No. 5, pp. 299-304 (6 pages total).
Michael J. Black et al., "On the Unification of Line Processes, Outlier Rejection, and Robust Statistics with Applications in Early Vision", International Journal of Computer Vision, vol. 19, No. 1, pp. 57-91, 1996 (53 pages total).
Zhengyou Zhang, "Parameter Estimation Techniques: A Tutorial with Application to Conic Fitting", INRIA, vol. 15, No. 1, pp. 59-76, 1997 (48 pages total).
Martin A. Fischler et al., "Random Sample Consensus: A Paradigm for Model Fitting with Applications to Image Analysis and Automated Cartography" Communications of the ACM, Jun. 1981, vol. 24, No. 6, pp. 381-395 (15 pages total).
Peter J. Rousseeuw, "Least Median of Squares Regression", Journal of the American Statistical Association, Dec. 1984, vol. 79, No. 388, pp. 871-880 (10 pages total).

\* cited by examiner

PARAMETER ESTIMATION APPARATUS, PARAMETER ESTIMATION METHOD, AND COMPUTER-READABLE RECORDING MEDIUM

This application is a National Stage Entry of PCT/JP2017/016869 filed on Apr. 27, 2017, the contents of all of which are incorporated herein by reference, in their entirety.

TECHNICAL FIELD

The present invention relates to a parameter estimation apparatus and a parameter estimation method for estimating a geometrical parameter that fits input data points including outliers, and further relates to a computer-readable recording medium having recorded thereon a program for realizing the parameter estimation apparatus and the parameter estimation method.

BACKGROUND ART

Estimation of a geometrical parameter that fits a plurality of data points is referred to as regression analysis, parameter fitting, or the like, and constitutes a significant element technology in various fields such as statistics, signal processing, image processing, and computer vision. Examples of the parameter to be estimated include a straight line, a parabola, a logistic curve, and the like for two-dimensional data points, a plane, a curved surface, a sphere, and the like for three-dimensional data points, and also include a hyperplane and the like for multidimensional data points. In the following, a general case will be described without particularly limiting the type of the parameter.

Data points serving as input commonly include observation noise, and thus, do not completely fit values on the parameter to be obtained. This is because there are errors (also called "distances") between the parameter and the data points. The least squares method is widely used as a parameter estimation method that minimizes errors at all data points when it is predicted that observation noise follows a normal distribution with an expected value of zero. The least squares method is used because it can be considered that the central limit theorem is satisfied; the central limit theorem states that observation noise can be approximated by a normal distribution given a large number of data points. Note that under limited circumstances where the distribution is already known, the distribution by which data points can be approximated in advance is not limited to a normal distribution, but the following description is provided regarding that data points can be approximated in advance with a normal distribution.

In actual parameter estimation, there are cases in which outliers, which are data points with values deviating significantly from other data points, are observed. On the other hand, data points that are not outliers, or that is, data points whose observation noise follows a normal distribution and which correctly fit values on the parameter are called inliers. For example, outliers are generated due to observation errors, recording errors, irregular samples not conforming to a normal distribution, and the like. The least squares method assumes that all data points follow a normal distribution. Thus, if there is even one such outlier, the least squares method works so as to minimize that significant error. Furthermore, as a result of this, a parameter that has low fitting accuracy with respect to the rest of the data points, i.e., the inliers, ends up being estimated.

Estimation methods such as the Least Median of Squares (LMeds) disclosed in Non-Patent Document 1, the random sample consensus (RANSAC) disclosed in Non-Patent Document 2, and the M-estimation (M-estimator) disclosed in Non-Patent Document 3 are widely known as methods for excluding such outliers and estimating parameters with high accuracy.

The LMeds disclosed in Non-Patent Document 1 randomly extracts the minimum number of data points necessary for parameter estimation from data points, performs parameter estimation, and calculates the errors at all points and the median of the errors. Furthermore, the LMeds repeats the random sampling for a certain number of times, and then regards the parameter yielding the lowest median of errors as the correct estimate. According to the LMeds, even cases in which outliers are included at a ratio of 50%, at maximum, can be dealt with.

The RANSAC disclosed in Non-Patent Document 2 also randomly extracts the minimum number of data points necessary for parameter estimation from data points, similarly to the LMeds. However, the RANSAC counts the number of inliers, whose errors are no greater than a predetermined threshold. Furthermore, the RANSAC repeats the random sampling and the counting of inliers for a certain number of times, and then regards the parameter yielding the most inliers as the correct estimate. The RANSAC can even deal with cases in which the ratio of outliers is 50% or more, and is advantageous for involving a smaller calculation amount than that involved in the LMeds.

The M-estimation repeats the calculation of errors and the updating of weights until errors converge, by using a weighting function designed so that the larger the error of a data point, the smaller the contribution, in place of the square errors in the least squares method. Note that Non-Patent Document 4 indicates that the M-estimation and the iteratively reweighted least squares (IRLS) are mathematically equivalent. In the M-estimation, a fixed value is used as the threshold for controlling the size of weighting, as in the LMeds and the RANSAC. That is, a smaller weight is applied for an error greater than the threshold, and a larger weight is applied for an error smaller than the threshold. The IRLS initializes the threshold with a sufficiently great value, and gradually decreases the threshold by multiplying a decay constant greater than zero and smaller than one for each iteration. In the following, the IRLS will be described in place of the M-estimation because the M-estimation is equivalent to a case in which the decay constant is fixed to one in the IRLS.

LIST OF PRIOR ART DOCUMENTS

Non-Patent Document

Non-Patent Document 1: P. J Rousseeuw, "Least Median of Squares Regression". Journal of the American Statistical Association. 79: 871-880, 1984.

Non-Patent Document 2: M. A. Fischler and R. C. Bolles, "Random Sample Consensus: A Paradigm for Model Fitting with Applications to Image Analysis and Automated Cartography," Comm. of the ACM, vol. 24, no. 6, pp. 381-395, 1981.

Non-Patent Document 3: Z. Zhang, "Parameter estimation techniques: A tutorial with application to conic fitting," International journal of Image and Vision Computing, vol. 15, no. 1, pp. 59-76, 1997.

Non-Patent Document 4: M. Black and A. Rangarajan, "On the unification of line processes, outlier rejection, and robust statistics with applications in early vision," International journal of computer vision, vol. 19, no. 1, pp. 57-91, 1996.

SUMMARY OF INVENTION

Problems to be Solved by the Invention

However, the following problems are found in random-sampling-based techniques, such as the LMeds and the RANSAC. The problems will be described in specific below.

First, the number of required repetitions increases exponentially depending on the outlier ratio. Due to this, it is difficult to estimate, in advance, the amount of calculation that would be involved in processing new data. In particular, the LMeds, in principle, cannot deal with cases such as where the outlier ratio exceeds 50%. The RANSAC can deal with such cases, but is not suitable for applications where high-speed performance is required at all times.

Next, random sampling has low stability because the same results cannot be acquired with random sampling, in principle, and different results are produced even from the same data points if random sampling is performed multiple times. Furthermore, it is difficult to set the threshold appropriately because the outlier error distribution is usually unknown. With too great a threshold, outliers are incorrectly determined as inliers. With too small a threshold, inliers are incorrectly determined as outliers, and moreover, the setting of such a threshold is one cause of a further increase in the number of iterations.

On the other hand, the number of iterations in the IRLS is dependent on the initial threshold, the decay constant, and a predefined minimum threshold, and thus, the maximum calculation amount can be estimated regardless of the outlier ratio. Furthermore, the IRLS method returns the same result for the same data points because random sampling is not performed. In such a manner, the use of the IRLS solves some of the problems with the LMeds and the RANSAC described above.

However, even if the IRLS is used, it is still difficult to set the threshold and the decay constant appropriately because the outlier error distribution is unknown. Furthermore, the influence of the threshold is greater in the IRLS than in the LMeds and the RANSAC because the threshold is continuously changed for each iteration in the IRLS.

One example object of the present invention is to provide a parameter estimation apparatus, a parameter estimation method, and a computer-readable recording medium that solve the above-described problems and can appropriately set a threshold for separating outliers and inliers in the estimation of a geometrical parameter fitting a plurality of data points.

Means for Solving the Problems

In order to achieve the above-described object, a parameter estimation apparatus in one aspect of the present invention is an apparatus for calculating a threshold for separating a plurality of data points into outliers and inliers and estimating a parameter fitting the inliers, the apparatus including:

a parameter estimation unit configured to estimate the parameter by using the plurality of data points as input;

a threshold setting unit configured to calculate the threshold based on statistical information of residuals of the plurality of data points; and a convergence determination unit configured to determine whether or not convergence of the estimation of the parameter is reached based on the estimated parameter and the calculated threshold, and to cause the parameter estimation unit and the threshold setting unit to each execute processing again if the convergence determination unit determines that convergence is not reached.

Also, in order to achieve the above-described object, a parameter estimation method in one aspect of the present invention is a method for calculating a threshold for separating a plurality of data points into outliers and inliers and estimating a parameter fitting the inliers, the method including:

(a) a step of estimating the parameter by using the plurality of data points as input;

(b) a step of calculating the threshold based on statistical information of residuals of the plurality of data points; and (c) a step of determining whether or not convergence of the estimation of the parameter is reached based on the estimated parameter and the calculated threshold, wherein the (a) step and the (b) step are each executed again if it is determined in the (c) step that convergence is not reached.

Furthermore, in order to achieve the above-described object, a computer-readable recording medium in one aspect of the present invention is a computer readable recording medium that includes a program recorded thereon that causes a computer to calculate a threshold for separating a plurality of data points into outliers and inliers and estimate a parameter fitting the inliers, the program including instructions that causes a computer to carry out:

(a) a step of estimating the parameter by using the plurality of data points as input;

(b) a step of calculating the threshold based on statistical information of residuals of the plurality of data points; and (c) a step of determining whether or not convergence of the estimation of the parameter is reached based on the estimated parameter and the calculated threshold, and the (a) step and the (b) step are each executed again if it is determined in the (c) step that convergence is not reached.

Advantageous Effects of the Invention

As described above, according to the present invention, a threshold for separating outliers and inliers can be set appropriately in the estimation of a geometrical parameter fitting a plurality of data points.

EXAMPLE EMBODIMENT

In the following, a parameter estimation apparatus, a parameter estimation method, and a program of an example embodiment of the present invention will be described with reference to FIGS. 1 to 5.

[Apparatus Configuration]

Figure 1:
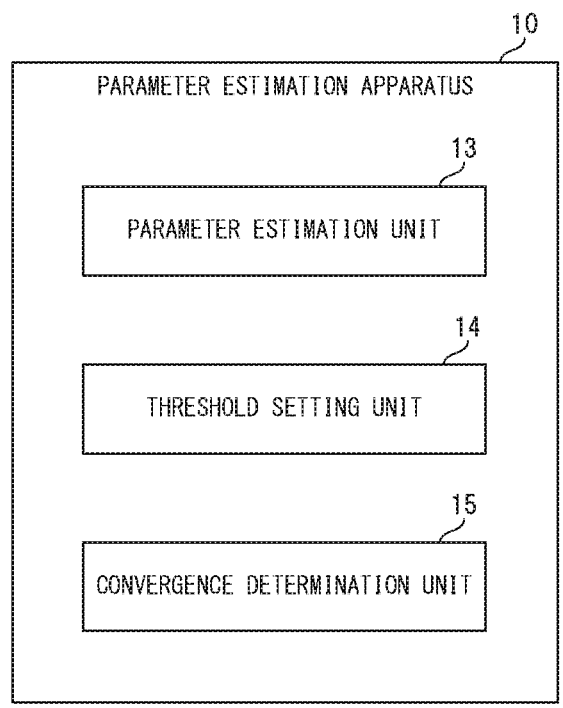
FIG. 1 is a block diagram illustrating a schematic configuration of a parameter estimation apparatus of an example embodiment of the present invention.

First, the configuration of a parameter estimation apparatus 10 in the present example embodiment will be described with reference to FIG. 1. FIG. 1 is a block diagram illustrating a schematic configuration of the parameter estimation apparatus of the example embodiment of the present invention.

The parameter estimation apparatus 10 in the present example embodiment, which is illustrated in FIG. 1, is an apparatus that calculates a threshold for separating a plurality of data points into outliers and inliers and estimates a parameter fitting the inliers. As illustrated in FIG. 1, the parameter estimation apparatus 10 includes a parameter estimation unit 13, a threshold setting unit 14, and a convergence determination unit 15.

The parameter estimation unit 13 estimates a parameter by using the plurality of data points as input. The threshold setting unit 14 calculates the threshold based on statistical information of residuals of the plurality of data points. The convergence determination unit 15 determines whether or not convergence of the estimation of the parameter is reached based on the estimated parameter and the calculated threshold. Furthermore, the convergence determination unit 15 causes the parameter estimation unit 13 and the threshold setting unit 14 to each execute processing again if the convergence determination unit 15 determines that convergence is not reached.

In such a manner, in the present example embodiment, a threshold for separating data points into outliers and inliers is calculated based on statistical information of residuals when a parameter is estimated iteratively. Due to this, according to the present example embodiment, a threshold for separating outliers and inliers in the estimation of a geometrical parameter fitting a plurality of data points, or to be more specific, the threshold in the IRLS, can be automatically set in an appropriate manner.

Figure 2:
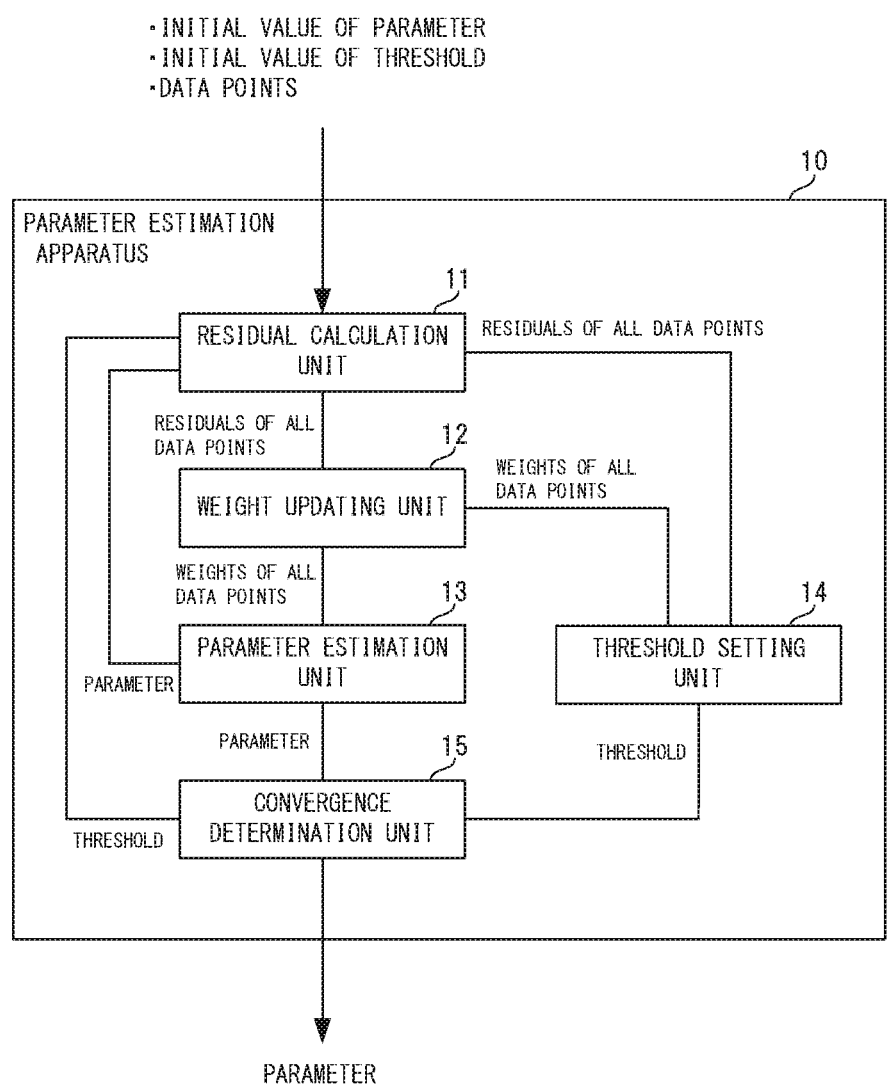
FIG. 2 is a block diagram illustrating a specific configuration of the parameter estimation apparatus of the example embodiment of the present invention.

Next, the configuration of the parameter estimation apparatus 10 in the present example embodiment will be described in detail with reference to FIG. 2. FIG. 2 is a block diagram illustrating a specific configuration of the parameter estimation apparatus of the example embodiment of the present invention. In the present example embodiment, the parameter estimation apparatus 10 includes a residual calculation unit 11 and a weight updating unit 12 in addition to the parameter estimation unit 13, the threshold setting unit 14, and the convergence determination unit 15, as illustrated in FIG. 2.

The residual calculation unit 11 first acquires, as input, a plurality of data points and an initial value of a parameter. Furthermore, the residual calculation unit 11 calculates residuals of the plurality of data points relative to the acquired initial value.

The weight updating unit 12, based on the calculated residuals, updates weights assigned to the plurality of data points. Furthermore, in the present example embodiment, the weight updating unit 12 updates the weights of the data points using a predetermined weighting function.

In the present example embodiment, the parameter estimation unit 13 estimates a parameter fitting the weighted data points by also using, as input, the updated weights of the data points in addition to the plurality of data points.

In the present example embodiment, the threshold setting unit 14 specifies the residuals of inliers, from among the residuals calculated by the residual calculation unit 11, and calculates a threshold based on statistical information of the specified residuals of the inliers. Specifically, the threshold setting unit 14 first acquires an initial value of the threshold. Next, the threshold setting unit 14 updates the acquired initial value using the statistical information and calculates a new threshold. Following this, the threshold setting unit 14 further updates the previously-updated threshold if the threshold needs to be calculated again.

Furthermore, in the present example embodiment, examples of the statistical information include the average, standard deviation, median, skewness, kurtosis, entropy, and the like of the residuals of the inliers. The value of the statistical information changes depending on the probability distribution that the residuals of the inliers are expected to have.

In the present example embodiment, the convergence determination unit 15 outputs the estimated parameter to the outside as a parameter fitting the inliers, if the convergence determination unit 15 determines that convergence is reached. Furthermore, if the convergence determination unit 15 determines that convergence is not reached, the convergence determination unit 15 sets the estimated parameter as an initial value and causes the residual calculation unit 11, the weight updating unit 12, the parameter estimation unit 13, and the threshold setting unit 14 to each execute processing again. That is, in the present example embodiment, parameter estimation is performed iteratively while updating the initial value of the parameter, until convergence of the parameter estimation is reached. Note that a specific example of the determination processing by the convergence determination unit 15 will be described later.

In such a manner, in the present example embodiment, the parameter estimation apparatus 10 sets a threshold for separating data points into inliers and outliers based on residuals of the data points relative to the parameter, and further, iterates the processing for setting the threshold until the residuals converge. Then, when convergence is reached, the parameter estimation apparatus 10 outputs a parameter fitting the inliers.

[Apparatus Operation]

Figure 3:
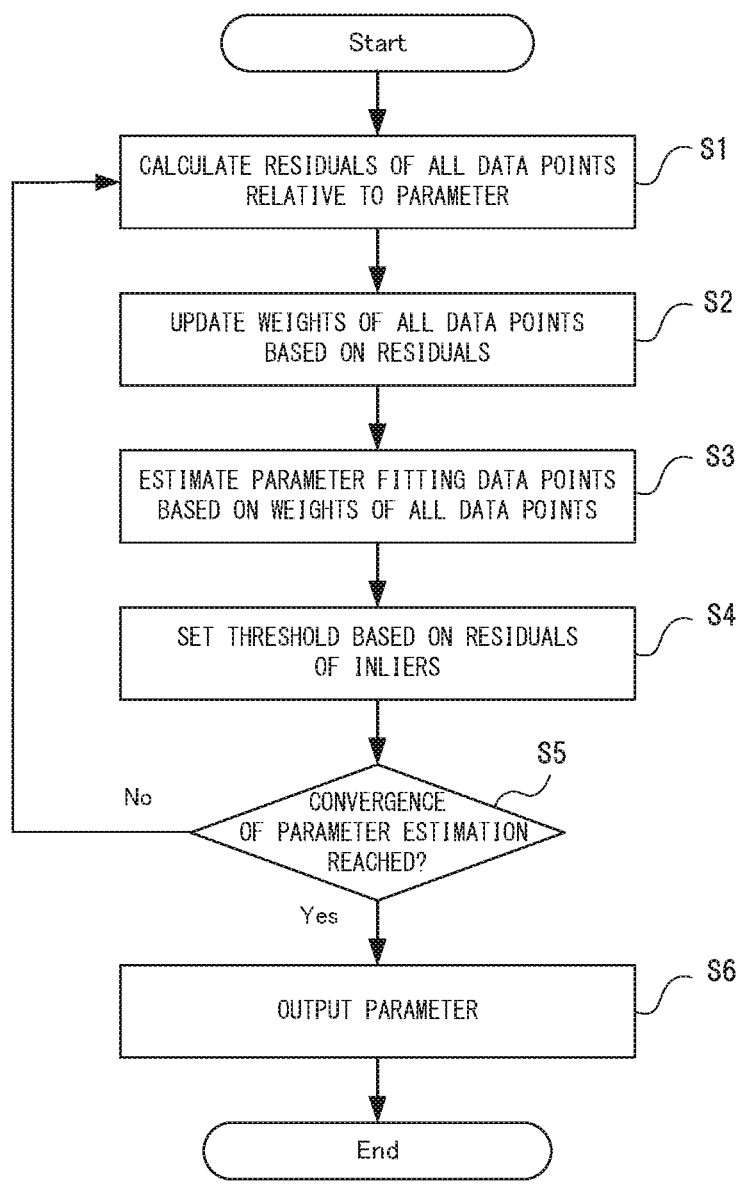
FIG. 3 is a flowchart illustrating operations of the parameter estimation apparatus of the example embodiment of the present invention.

Next, the operations of the parameter estimation apparatus 10 in the present example embodiment will be described with reference to FIG. 3. FIG. 3 is a flowchart illustrating the operations of the parameter estimation apparatus of the example embodiment of the present invention. FIGS. 1 and 2 will be referred to as needed in the following description. Furthermore, in the present example embodiment, a parameter estimation method is implemented by causing the parameter estimation apparatus 10 to operate. Accordingly, the following description of the operations of the parameter estimation apparatus 10 is substituted for the description of the parameter estimation method in the present example embodiment.

As illustrated in FIG. 3, first, when a plurality of data points, an initial value of a parameter, and an initial value of a threshold are input to the parameter estimation apparatus 10, the residual calculation unit 11 calculates, for each data point, a residual of the data point relative to the initial value of the parameter (step S1).

For example, in step S1, a random number may be given as the initial value of the parameter, or predetermined default values (for example, "slope=1" and "intercept=0" for a straight line) may be given as the initial value of the parameter. Furthermore, when the data points and the parameter change continuously in time series, a parameter calculated at a previous time may be input as the initial value of the parameter. Also, if the reliability of the data points is acquired in advance as in the case of matching scores of image feature points, the initial value may be given by a least squares method using weighting based on the reliability.

Furthermore, for example, the greatest-possible real-number value in the program may be given as the initial value of the threshold, or in cases in which the maximum of residuals is known through experimentation or experience, such values may be given as the initial value of the threshold. Also, when the data points and the parameter change continuously in time series, a value yielded by multiplying the maximum value of the residuals at a previous time by a constant may be given as the initial value of the threshold.

Furthermore, it suffices for the number of data points input to be no less than the minimum number of data points required to express the parameter to be estimated. For example, the number is two or more if the parameter is a straight line and three or more if the parameter is a plane. Furthermore, if the number of points is not enough for parameter estimation, the parameter estimation apparatus 10 may output a flag indicating that parameter estimation cannot be executed or a parameter indicating that parameter estimation cannot be executed (for example, a parameter all values of which are zero or infinity) and end processing.

Furthermore, in the present example embodiment, a residual is an indicator indicating the degree of fit of each data point with respect to the parameter. For example, examples of the residuals include geometrical distances formed by perpendicular lines extended down from data points to a line or plane expressed by the parameter, the Mahalanobis distance, which takes into account the noise dispersion of data points, and the like.

Next, the weight updating unit 12 uses the residuals calculated in step S1 as input, and updates the weights of the data points in accordance with a predetermined weighting function (step S2). Examples of the weighting function to be used in step S2 include a function that returns values inversely proportional to the residuals, or to be specific, a function returning smaller values for greater residuals and returning greater values for smaller residuals.

Next, the parameter estimation unit 13 estimates a parameter that fits the weighted data points by using, as input, the data points and the weights of the data points updated in step S2 (step S3).

Next, the threshold setting unit 14 uses, as input, the residuals of the inliers, from among the residuals calculated in step S1, and sets a new threshold using statistical information of the residuals of the inliers (step S4).

Next, the convergence determination unit 15 determines whether or not convergence of parameter estimation is reached, based on the parameter estimated in step S3 and the threshold calculated in step S4 (step S5).

If the result of the determination in step S5 is that convergence is not reached, the convergence determination unit 15 sets the parameter estimated in step S3 as the initial value of the parameter and sets the threshold calculated in step S4 as the initial value of the threshold. Following this, the residual calculation unit 11 executes step S1 again using the new initial values. Accordingly, steps S2 to S4 are also executed again.

On the other hand, if the result of the determination in step S5 is that convergence is reached, the convergence determination unit 15 outputs the parameter estimated in step S3 (step S6). Accordingly, processing by the parameter estimation apparatus 10 ends.

Furthermore, the "convergence of parameter estimation" as used in the present example embodiment has the same meaning as "convergence" as used in common optimization calculations and numerical calculations, and refers to a state for which a determination is made that the values of the parameter and threshold would not change even if iterative calculations were repeated any further.

Thus, for example, the convergence determination unit 15 can calculate at least one of the difference in the parameter and the difference in the threshold between a previous iteration of processing from step S1 to step S4 and the latest iteration of processing from step S1 to step S4, and can determine that convergence is reached when the difference is no greater than a certain value. Furthermore, for example, the convergence determination unit 15 can also determine that convergence is reached when the threshold set in the latest instance of step S4 is no greater than a certain value.

Specific Example

Next, a specific example of the processing performed by the parameter estimation apparatus 10 will be described below. Note that in the specific example below, the vector $\theta$ is the parameter to be estimated, the vector $x_i$ is the ith data point, and $f(x_i; \theta)$ is the function for calculating the residual of the ith data point relative to the parameter $\theta$. Further, suppose that $w_i$ is the weight of the ith data point and $\lambda$ is the threshold, and the total number of data points is N. Note that, in the present specific example, the weight $w_i$ is a real number between 0 and 1 ($0 \leq w_i \leq 1$) because the weights assigned to the data points are relative.

First, the IRLS is defined. The IRLS is an operation in which the optimization expressed by Formula. 1 below is repeated while gradually decreasing the threshold X from the initial value.

$$\min_{X} \sum_{i=1}^{N} w_i f(x_i; \theta)^2 + \lambda g(w_i) \qquad \text{[Formula. 1]}$$

Here, the function $g(w_i)$ is referred to as a penalty function, and is an arbitrarily-defined function that takes zero if $w_i$ approaches one. The present specific example will be described assuming that Formula. 2 below holds true.

$$g(w_i) = 1 - \sqrt{w_i})^2 \qquad \text{[Formula. 2]}$$

In a given iteration (steps S1 to S4), each weight $w_i$ can be yielded by solving the equation expressed by Formula. 3 below, which is yielded when Formula. 1 above is differentiated with respect to $w_i$ and equated to zero.

$$f(x_i; \theta)^2 + \lambda \frac{\partial g}{\partial w}\bigg|_{w=w_i} = 0 \qquad \text{[Formula. 3]}$$

Formula. 4 below is yielded if Formula. 3 is solved for a case in which Formula. 2 above holds true.

$$w_i = \left(\frac{\lambda}{\lambda + f(x_i; \theta)^2}\right)^2 \qquad \text{[Formula. 4]}$$

If Formula. 4 above is seen as a function of X, it can be seen that X takes a value from zero to one. Furthermore, above-described Non-Patent Document 4 indicates that Formula. 4 above corresponds to the weighting function in the M-estimation according to Geman-McClure.

Here, the above-described specific example will be further described in line with steps S1 to S5 illustrated in FIG. 3. First, in step S1, the residual calculation unit 11 calculates the residuals $f(x_i; \theta)$ of data points $x_i$ in relation to the parameter $\theta$.

Next, in step S2, the weight updating unit 12 updates the weights $w_i$ of the data points $x_i$ in accordance with the threshold X and Formula. 4 above.

Next, in step S3, the parameter estimation unit 13 substitutes the weights $w_i$ updated in step S2 into Formula. 1 above, and estimates the parameter $\theta$ that minimizes the optimization problem. For example, the solution of the optimization problem can be calculated using the Gauss-Newton method, the Levenberg-Marquardt method, and the like, taking advantage of the fact that Formula. 1 above is the sum of squares of $mf(x_i; \theta)$.

Next, in step S4, the threshold setting unit 14 uses the residuals $f(x_i; \theta)$ calculated in step S1 and the weights $w_i$ updated in step S2 to set a new threshold X.

Specifically, the threshold setting unit 14 first determines whether each data point is an inlier, based on the weight $w_i$. Since the weights take a value between zero and one, the threshold setting unit 14 determines data points having weights $w_i$ no smaller than 0.5 as inliers, for example. Note that stricter determination results would be yielded if data points are determined as inliers when having weights $w_i$ close to one.

Next, the threshold setting unit 14 sets the new threshold X using only the residuals of the inliers. Here, when supposing that the residuals of the inliers follow a normal distribution with an expectation value of $\mu$ and a standard deviation of $\sigma$, it can be considered that the residuals of the inliers are distributed within a range of $\mu+\beta\sigma$, where $\beta$ is a given constant. For example, given $\beta=1$ and $\beta=2$, approximately 84% and approximately 97% of the residuals $f(x_i; \theta)$, respectively, would be within the range, and these residuals would be no greater than $\mu+\beta\sigma$. That is, by performing an update so that $\lambda=\mu+\beta\sigma$, an arbitrarily-defined ratio of inliers at the point of the iteration can be extracted.

Next, in step S5, the convergence determination unit 15 determines whether or not convergence of the parameter estimation is reached, by using, as input, the parameter $\theta$ estimated in step S3 and the threshold $\lambda$ set in step S4.

As described above, for example, the convergence determination unit 15 compares the difference between the parameter $\theta$ or threshold $\lambda$ yielded by executing a previous iteration of processing from step S1 to step S4 and the parameter $\theta$ or threshold $\lambda$ yielded by executing the latest iteration of processing from step S1 to step S4, and determines that convergence is reached if the difference is no greater than a certain value. Further, the convergence determination unit 15 may determine that convergence is reached if the threshold $\lambda$ set in the latest iteration of step S4 is smaller than a predetermined minimum value.

If the result of the determination is that convergence is not reached, the convergence determination unit 15 sets the parameter estimated in step S3 as the initial value of the parameter and sets the threshold calculated in step S4 as the initial value of the threshold. Following this, step S1 and the following steps are executed again. On the other hand, if the result of the determination is that convergence is reached, the convergence determination unit 15 outputs the parameter estimated in step S3.

[Effects in Example Embodiment]

As described above, according to the present example embodiment, the threshold in the IRLS can be set automatically and appropriately, and outliers and inliers can be separated with high accuracy. Furthermore, as a result of this, a parameter that fits the inliers can be estimated with high accuracy.

Figure 4:
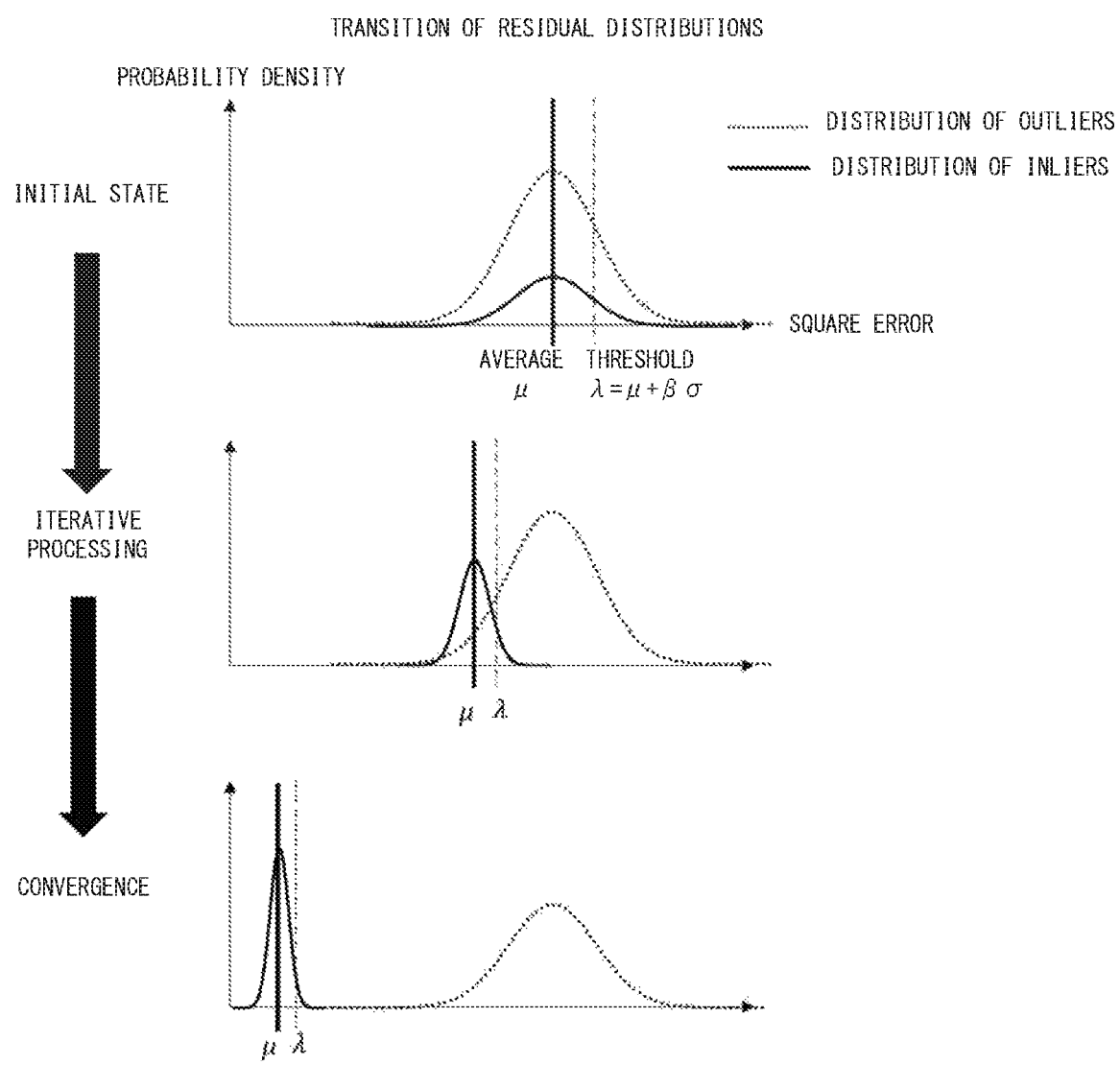
FIG. 4 is a diagram illustrating a transition of residual distributions of inliers and outliers in the example embodiment of the present invention.

Here, the principle of how the inliers and outliers can be separated by iteratively executing above-described steps S1 to S4 will be described with reference to FIG. 4. FIG. 4 is a diagram illustrating the transition of residual distributions of inliers and outliers in the example embodiment of the present invention. FIG. 4 provides illustration from an initial state to a converged state, from the top level toward the bottom level.

As illustrated in FIG. 4, two residual distributions are mixed in the initial state in the top level, or that is, the state in which hardly any distinction can be made between inliers and outliers. Based on the central limit theorem, this can be assumed as being a mixed normal distribution. Here, defining $\lambda=\mu+\beta\sigma$ in step S4 means that the weights $w_i$ of data points having residuals $f(x_i; \theta)$ greater than $\mu+\beta\sigma$ rapidly decrease. Furthermore, the provision of larger weights to data points is equivalent to an increase in the proportion occupied by inliers in the parameter. If Formula. 1 above is solved in a state in which the inlier ratio has increased, a parameter $\theta$ better fitting the inliers is yielded through the calculation, and the state transitions to the state in the middle level of FIG. 4. Furthermore, if steps S1 to S4 are iterated, convergence to a state in which the inliers and outliers are separated is eventually reached, as illustrated in the bottom tier of FIG. 4.

[Modifications]

Here, modifications 1 to 4 in the present example embodiment will be described. The present invention is not limited to only the above-described example embodiment. In the present invention, various changes that can be understood by a so-called person skilled in the art can be applied to the above-described example embodiment. For example, the present invention can also be implemented in the forms indicated in the following modifications.

(1) Modification 1

The penalty function to be used is not limited to the above-described example embodiment. For example, Non-Patent Document 4 discloses various specific examples of penalty functions in detail. Furthermore, Non-Patent Document 4 discloses a method of conversion between the IRLS and the M-estimation. Thus, the various M-estimation functions disclosed in Non-Patent Document 3 can be used.

(2) Modification 2

The method for setting the threshold is not limited to the above-described example embodiment. For example, rapid decay may be suppressed by storing the threshold acquired through a previous iteration (the execution of steps S1 to S4) and setting the threshold so that the difference between the threshold acquired through the previous iteration and the threshold acquired through the present iteration is no greater than a certain value. Furthermore, for example, a calculation based on the conventional method using the decay constant may also be performed, and the smaller one or greater one of the values may be used as a new threshold. Also, for example, in a case in which the residual distribution of inliers is a Cauchy distribution, there would be no expectation value or standard deviation, and thus, a scale constant giving the mode and the half-width at half-maximum in place may be used.

(3) Modification 3

The method for determining convergence is not limited to the above-described example embodiment. For example, as the criterion for making the determination of convergence, the difference in the objective function expressed by Formula. 1 above before and after an iteration may be used, or the differences in the weights $w_i$ of data points may be used. Here, the convergence determination unit 15 receives, as input, the objective function expressed by Formula. 1 above or the weights $w_i$.

(4) Modification 4

Data input to the parameter estimation apparatus 10 is not limited to the examples described in the above-described example embodiment. For example, an initial value of weight can be input in place of an initial value of a parameter. In this case, the parameter estimation unit 13 executes processing first, and then processing is executed in the order of the residual calculation unit 11, the weight updating unit 12, the threshold setting unit 14, and the convergence determination unit 15 in the parameter estimation apparatus 10. Note that the order in which processing performed by the respective units is executed can be changed as appropriate.

[Program]

It suffices for the program in the present example embodiment to be a program that causes a computer to execute steps S1 to S6 illustrated in FIG. 3. The parameter estimation apparatus and the parameter estimation method in the present example embodiment can be realized by installing this program onto a computer and executing the program. In this case, the central processing unit (CPU) of the computer functions and performs processing as the residual calculation unit 11, the weight updating unit 12, the parameter estimation unit 13, the threshold setting unit 14, and the convergence determination unit 15.

Furthermore, the program in the present example embodiment may be executed by a computer system structured using a plurality of computers. In this case, for example, each computer may function as one out of the residual calculation unit 11, the weight updating unit 12, the parameter estimation unit 13, the threshold setting unit 14, and the convergence determination unit 15.

Figure 5:
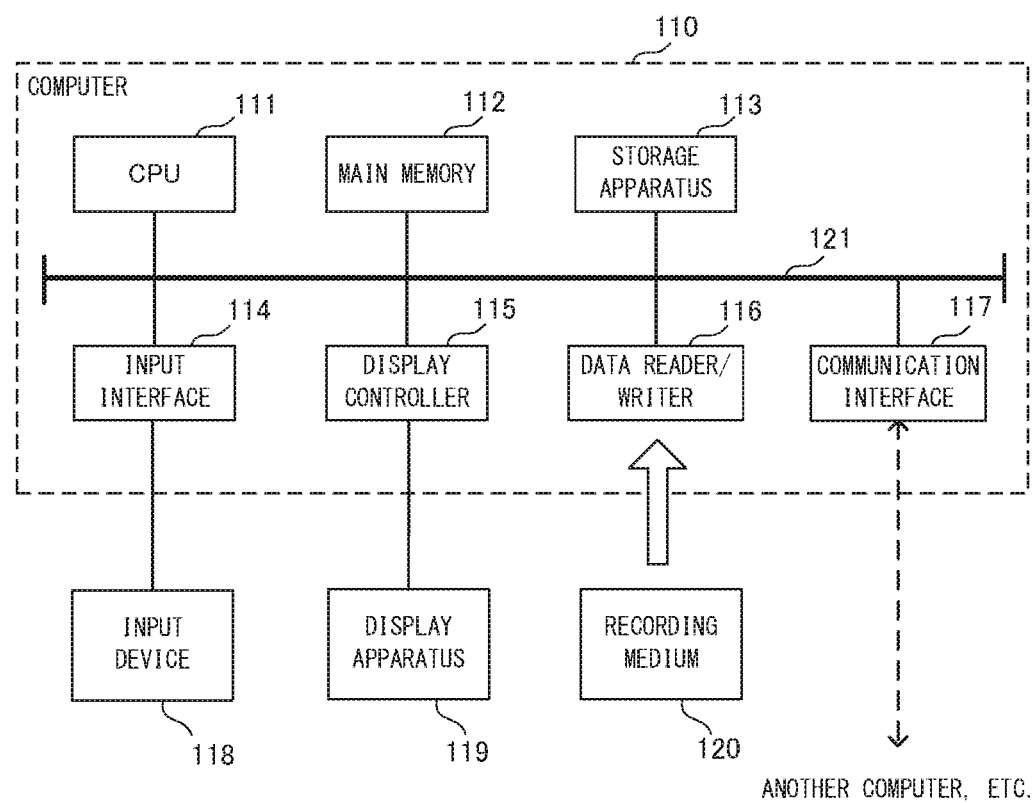
FIG. 5 is a block diagram illustrating one example of a computer realizing the parameter estimation apparatus of the example embodiment of the present invention.

Here, a computer that realizes the parameter estimation apparatus 10 by executing the program in the present example embodiment will be described with reference to FIG. 5. FIG. 5 is a block diagram illustrating one example of a computer realizing the parameter estimation apparatus of the example embodiment of the present invention.

As shown in FIG. 5, a computer 110 includes a CPU 111, a main memory 112, a storage apparatus 113, an input interface 114, a display controller 115, a data reader/writer 116, and a communication interface 117. These units are each connected so as to be capable of performing data communications with each other through a bus 121.

The CPU 111 opens the program (code) according to this example embodiment, which has been stored in the storage device 113, in the main memory 112 and performs various operations by executing the codes in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display by the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Note that the parameter estimation device 10 according to this example embodiment can be realized not only by a computer with a program installed, but also by using hardware corresponding to each part. Further, a configuration may be adopted in which a portion of the parameter estimation device 10 is realized by a program, and the remaining portions are realized by hardware. Also, in the parameter estimation device 10, each unit may be realized as a separate unit.

Some portion or all of the example embodiments described above can be realized according to (supplementary note 1) to (supplementary note 15) described below, but the below description does not limit the invention.

(Supplementary Note 1)

An apparatus for calculating a threshold for separating a plurality of data points into outliers and inliers and estimating a parameter fitting the inliers, the apparatus including:

a parameter estimation unit configured to estimate the parameter by using the plurality of data points as input;

a threshold setting unit configured to calculate the threshold based on statistical information of residuals of the plurality of data points; and a convergence determination unit configured to determine whether or not convergence of the estimation of the parameter is reached based on the estimated parameter and the calculated threshold, and to cause the parameter estimation unit and the threshold setting unit to each execute processing again if the convergence determination unit determines that convergence is not reached.

(Supplementary Note 2)

The parameter estimation apparatus according to Supplementary Note 1, further including:

a residual calculation unit configured to acquire the plurality of data points and an initial value of the parameter and to calculate residuals of the plurality of data points relative to the acquired initial value; and a weight updating unit configured to, based on the calculated residuals, update weights assigned to the plurality of data points, wherein the parameter estimation unit estimates the parameter by also using, as input, the updated weights of the plurality of data points in addition to the plurality of data points, the threshold setting unit specifies residuals of the inliers, from among the calculated residuals, and calculates the threshold based on the statistical information of the specified residuals of the inliers, and the convergence determination unit outputs the estimated parameter as a parameter fitting the inliers if the convergence determination unit determines that convergence is reached, and sets the estimated parameter as the initial value and causes the residual calculation unit, the weight updating unit, the parameter estimation unit, and the threshold setting unit to each execute processing again if the convergence determination unit determines that convergence is not reached.

(Supplementary Note 3)

The parameter estimation apparatus according to Supplementary Note 2, wherein the parameter estimation unit estimates the parameter by executing the iteratively reweighted least squares or M-estimation.

(Supplementary Note 4)

The parameter estimation apparatus according to Supplementary Note 2 or 3, wherein the threshold setting unit calculates the statistical information from a prior probability distribution of the residuals of the inliers, and calculates the threshold based on the calculated statistical information.

(Supplementary Note 5

The parameter estimation apparatus according to Supplementary Note 4, wherein the prior probability distribution is expressed by a mixed normal distribution, and the threshold setting unit calculates an average and a standard deviation of the residuals of the inliers as the statistical information.

(Supplementary Note 6)

A method for calculating a threshold for separating a plurality of data points into outliers and inliers and estimating a parameter fitting the inliers, the method including:

(a) a step of estimating the parameter by using the plurality of data points as input;

(b) a step of calculating the threshold based on statistical information of residuals of the plurality of data points; and (c) a step of determining whether or not convergence of the estimation of the parameter is reached based on the estimated parameter and the calculated threshold, wherein the (a) step and the (b) step are each executed again if it is determined in the (c) step that convergence is not reached.

(Supplementary Note 7)

The parameter estimation method according to Supplementary Note 6, further including:

(d) a step of acquiring the plurality of data points and an initial value of the parameter and calculating residuals of the plurality of data points relative to the acquired initial value; and (e) a step of, based on the calculated residuals, updating weights assigned to the plurality of data points, wherein in the (a) step, the parameter is estimated by also using, as input, the weights of the plurality of data points updated in the (e) step in addition to the plurality of data points, in the (b) step, residuals of the inliers, from among the residuals calculated in the (d) step, are specified and the threshold is calculated based on the statistical information of the specified residuals of the inliers, if it is determined in the (c) step that convergence is reached, the estimated parameter is output as a parameter fitting the inliers in the (c) step, and if it is determined in the (c) step that convergence is not reached, the parameter estimated in the (a) step is set as the initial value and the (d) step, the (e) step, the (a) step, and the (b) step are each executed again.

(Supplementary Note 8)

The parameter estimation method according to Supplementary Note 7, wherein, in the (a) step, the parameter is estimated by executing the iteratively reweighted least squares or M-estimation.

(Supplementary Note 9)

The parameter estimation method according to Supplementary Note 7 or 8, wherein, in the (b) step, the statistical information is calculated from a prior probability distribution of the residuals of the inliers, and the threshold is calculated based on the calculated statistical information.

(Supplementary Note 10)

The parameter estimation method according to Supplementary Note 9, wherein the prior probability distribution is expressed by a mixed normal distribution, and in the (b) step, an average and a standard deviation of the residuals of the inliers are calculated as the statistical information.

(Supplementary Note 11)

A computer readable recording medium that includes a program recorded thereon that causes a computer to calculate a threshold for separating a plurality of data points into outliers and inliers and estimate a parameter fitting the inliers, the program including instructions that causes a computer to carry out:

(a) a step of estimating the parameter by using the plurality of data points as input;

(b) a step of calculating the threshold based on statistical information of residuals of the plurality of data points; and (c) a step of determining whether or not convergence of the estimation of the parameter is reached based on the estimated parameter and the calculated threshold, and the (a) step and the (b) step are each executed again if it is determined in the (c) step that convergence is not reached.

(Supplementary Note 12)

The computer-readable recording medium according to Supplementary Note 11, wherein the program further includes instructions that cause the computer to carry out:

(d) a step of acquiring the plurality of data points and an initial value of the parameter and calculating residuals of the plurality of data points relative to the acquired initial value; and (e) a step of, based on the calculated residuals, updating weights assigned to the plurality of data points, in the (a) step, the parameter is estimated by also using, as input, the weights of the plurality of data points updated in the (e) step in addition to the plurality of data points, in the (b) step, residuals of the inliers, from among the residuals calculated in the (d) step, are specified and the threshold is calculated based on the statistical information of the specified residuals of the inliers, if it is determined in the (c) step that convergence is reached, the estimated parameter is output as a parameter fitting the inliers in the (c) step, and if it is determined in the (c) step that convergence is not reached, the parameter estimated in the (a) step is set as the initial value and the (d) step, the (e) step, the (a) step, and the (b) step are each executed again.

(Supplementary Note 13)

The computer-readable recording medium according to Supplementary Note 12, wherein, in the (a) step, the parameter is estimated by executing the iteratively reweighted least squares or M-estimation.

(Supplementary Note 14)

The computer-readable recording medium according to Supplementary Note 12 or 13, wherein, in the (b) step, the statistical information is calculated from a prior probability distribution of the residuals of the inliers, and the threshold is calculated based on the calculated statistical information.

(Supplementary Note 15)

The computer-readable recording medium according to Supplementary Note 14, wherein the prior probability distribution is expressed by a mixed normal distribution, and in the (b) step, an average and a standard deviation of the residuals of the inliers are calculated as the statistical information.

The present invention has been described with reference to an example embodiment above, but the present invention is not limited to the above-described example embodiment. Within the scope of the present invention, various changes that could be understood by a person skilled in the art could be applied to the configurations and details of the invention.

INDUSTRIAL APPLICABILITY

As described above, according to the present invention, a threshold for separating outliers and inliers can be set appropriately in the estimation of a geometrical parameter fitting a plurality of data points. The present invention is useful in fields in which geometrical parameters fitting a plurality of data points need to be estimated, such as statistics, signal processing, image processing, computer vision, and the like.

LIST OF REFERENCE SIGNS

10 Parameter estimation apparatus
11 Residual calculation unit
12 Weight updating unit
13 Parameter estimation unit
14 Threshold setting unit
15 Convergence determination unit
110 Computer
111 CPU
112 Main memory
113 Storage apparatus
114 Input interface
115 Display controller
116 Data reader/writer
117 Communication interface
118 Input device
119 Display apparatus
120 Recording medium
121 Bus

What is claimed is:

1. An apparatus for calculating a threshold for separating a plurality of data points into outliers and inliers and estimating a parameter fitting the inliers, the apparatus comprising:
   one or more computer-readable memories having program instructions stored therein;
   one or more processors that when executing the program instructions implement:
      a parameter estimation unit configured to estimate the parameter by using the plurality of data points as input;
      a threshold setting unit configured to calculate the threshold based on statistical information of residuals of the plurality of data points;
      a convergence determination unit configured to determine whether or not convergence of the estimation of the parameter is reached based on the estimated parameter and the calculated threshold, and to cause the parameter estimation unit and the threshold setting unit to each execute processing again if the convergence determination unit determines that convergence is not reached;
      a residual calculation unit configured to acquire the plurality of data points and an initial value of the parameter and to calculate residuals of the plurality of data points relative to the acquired initial value; and
      a weight updating unit configured to, based on the calculated residuals, update weights assigned to the plurality of data points,
   wherein the parameter estimation unit estimates the parameter by also using, as input, the updated weights of the plurality of data points in addition to the plurality of data points,
   the threshold setting unit specifies residuals of the inliers, from among the calculated residuals, and calculates the threshold based on the statistical information of the specified residuals of the inliers, and
   the convergence determination unit
      outputs the estimated parameter as a parameter fitting the inliers if the convergence determination unit determines that convergence is reached, and
      sets the estimated parameter as the initial value and causes the residual calculation unit, the weight updating unit, the parameter estimation unit, and the threshold setting unit to each execute processing again if the convergence determination unit determines that convergence is not reached.

2. The parameter estimation apparatus according to claim 1, wherein the parameter estimation unit estimates the parameter by executing the iteratively reweighted least squares or M-estimation.

3. The parameter estimation apparatus according to claim 1, wherein the threshold setting unit calculates the statistical information from a prior probability distribution of the residuals of the inliers, and calculates the threshold based on the calculated statistical information.

4. The parameter estimation apparatus according to claim 3, wherein the prior probability distribution is expressed by a mixed normal distribution, and
   the threshold setting unit calculates an average and a standard deviation of the residuals of the inliers as the statistical information.

5. A method for calculating a threshold for separating a plurality of data points into outliers and inliers and estimating a parameter fitting the inliers, the method, performed by a computer, comprising:
   (a) estimating the parameter by using the plurality of data points as input;
   (b) calculating the threshold based on statistical information of residuals of the plurality of data points; and
   (c) determining whether or not convergence of the estimation of the parameter is reached based on the estimated parameter and the calculated threshold, wherein the (a) and the (b) are each executed again if it is determined in the (c) that convergence is not reached;
   the method further comprising:
   (d) acquiring the plurality of data points and an initial value of the parameter and calculating residuals of the plurality of data points relative to the acquired initial value; and
   (e) based on the calculated residuals, updating weights assigned to the plurality of data points, wherein
   in the (a), the parameter is estimated by also using, as input, the weights of the plurality of data points updated in the (e) in addition to the plurality of data points, in the (b), residuals of the inliers, from among the residuals calculated in the (d), are specified and the threshold is calculated based on the statistical information of the specified residuals of the inliers, if it is determined in the (c) that convergence is reached, the estimated parameter is output as a parameter fitting the inliers in the (c), and if it is determined in the (c) that convergence is not reached, the parameter estimated in the (a) step is set as the initial value and the (d), the (e), the (a), and the (b) are each executed again.

6. The parameter estimation method according to claim 5, wherein, in the (a), the parameter is estimated by executing the iteratively reweighted least squares or M-estimation.

7. The parameter estimation method according to claim 5, wherein, in the (b), the statistical information is calculated from a prior probability distribution of the residuals of the inliers, and the threshold is calculated based on the calculated statistical information.

8. The parameter estimation method according to claim 7, wherein the prior probability distribution is expressed by a mixed normal distribution, and in the (b), an average and a standard deviation of the residuals of the inliers are calculated as the statistical information.

9. A non-transitory computer readable recording medium that includes a program recorded thereon that causes a computer to calculate a threshold for separating a plurality of data points into outliers and inliers and estimate a parameter fitting the inliers, the program including instructions that causes a computer to carry out:

(a) a step of estimating the parameter by using the plurality of data points as input;

(b) a step of calculating the threshold based on statistical information of residuals of the plurality of data points; and (c) a step of determining whether or not convergence of the estimation of the parameter is reached based on the estimated parameter and the calculated threshold, and the (a) step and the (b) step are each executed again if it is determined in the (c) step that convergence is not reached;

the program further incudes instructions that cause the computer to carry out:

(d) a step of acquiring the plurality of data points and an initial value of the parameter and calculating residuals of the plurality of data points relative to the acquired initial value; and (e) a step of, based on the calculated residuals, updating weights assigned to the plurality of data points, in the (a) step, the parameter is estimated by also using, as input, the weights of the plurality of data points updated in the (e) step in addition to the plurality of data points, in the (b) step, residuals of the inliers, from among the residuals calculated in the (d) step, are specified and the threshold is calculated based on the statistical information of the specified residuals of the inliers, if it is determined in the (c) step that convergence is reached, the estimated parameter is output as a parameter fitting the inliers in the (c) step, and if it is determined in the (c) step that convergence is not reached, the parameter estimated in the (a) step is set as the initial value and the (d) step, the (e) step, the (a) step, and the (b) step are each executed again.

10. The non-transitory computer-readable recording medium according to claim 7, wherein, in the (a) step, the parameter is estimated by executing the iteratively reweighted least squares or M-estimation.

11. The non-transitory computer-readable recording medium according to claim 7, wherein, in the (b) step, the statistical information is calculated from a prior probability distribution of the residuals of the inliers, and the threshold is calculated based on the calculated statistical information.

12. The non-transitory computer-readable recording medium according to claim 11, wherein the prior probability distribution is expressed by a mixed normal distribution, and in the (b) step, an average and a standard deviation of the residuals of the inliers are calculated as the statistical information.

* * * * *